United States Patent Office 3,538,130
Patented Nov. 3, 1970

3,538,130
SUBSTITUTED METHYLENE STEROIDS AND
THEIR PREPARATION
Colin Leslie Hewett, Gilbert Frederick Woods, and Robert Thomas Logan, Glasgow, Scotland, assignors to Organon Inc., West Orange, N.J., a corporation of New Jersey
No Drawing. Filed Aug. 20, 1968, Ser. No. 753,887
Claims priority, application Great Britain, Aug. 25, 1967, 39,169/67; Sept. 1, 1967, 40,116/67
Int. Cl. C07c *169/30*
U.S. Cl. 260—397.45          2 Claims

ABSTRACT OF THE DISCLOSURE

The present invention relates to novel 16,17-(substituted methylene)-11,20-oxygenated steroids of the pregnane series exerting strong glucocorticoid, anti-inflammatory, progestational, anti-uterotrophic, ovulation-inhibiting and pregnancy-maintaining properties, and to a process for the preparation thereof.

---

This invention relates to novel 16α,17α-methylene steroids, in which the methylene group is substituted, and to a process for their preparation.

More particularly, it relates to novel 16α,17α-(substituted methylene)-steroids of the pregnane series having the partial formula:

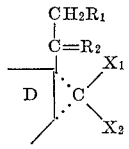

wherein
$R_1$=H, OH, OAcyl or halogen,
$R_2$=O, H(OH) or H(OAcyl),
$X_1$=hydrogen or a saturated or unsaturated hydrocarbon,
$X_2$=saturated or unsaturated hydrocarbon, or
$X_1+X_2$=together with the methylene carbon atom a saturated or unsaturated cycloaliphatic radical.

The present invention particularly comprises the novel compounds having the formula:

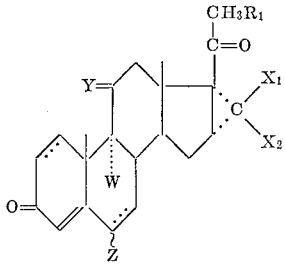

wherein
$C_1-C_2$ and/or $C_6-C_7$ may be a single or double bond,
Y=H(OH), H(OAcyl) or O,
W=H or halogen,
Z=H, $CH_3$ or halogen, and
$R_1$, $X_1$ and $X_2$ have the meanings as defined above.

The compounds according to the invention are very valuable on account of their biological activities. They exert strong glucocorticoid, anti-inflammatory, progestational, anti-uterotrophic, ovulation-inhibiting and pregnancy-maintaining activities.

The compounds according to the invention may be administered parenterally or orally in the form of suspensions, solutions, emulsions or solid pharmaceutical dosage unit forms, usually after mixing with auxiliaries, or, if desired, with other active components.

16,17-methylene-steroids, in which the methylene group is not substituted, are known. They are obtained as by-product in extremely low yields by subjecting the corresponding 16,17-pyrazolino compounds to thermal treatment, a process which leads principally to 16-methyl-$\Delta^{16}$-steroids, or in better yield by treatment with an acid catalyst., Surprisingly, it has now been found that 16,17-(substituted methylene)-steroids as defined above can be obtained from the substituted pyrazolino-steroids in good yield by thermal treatment or by photolysis with only trace amounts of the $\Delta^{16}$-compounds being formed as by-products. Treatment of the pyrazolino-steroids with an acid catalyst rather surprisingly gives lower yields of the substituted methylene compounds from the substituted pyrazolino steroids.

The reaction may be illustrated by the following reaction scheme.

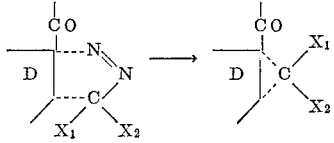

wherein $X_1$ and $X_2$ have the meanings as defined above.

The 16,17-(substituted-pyrazolino)-steroids can be obtained by the reaction of a suitable $\Delta^{16}$-20-keto-steroid with the appropriate diazo-compound of the formula $X_1X_2$-C-$N_2$. This reaction is usually carried out in a suitable organic solvent such as an ether or a halogenated hydrocarbon, and at a temperature preferably below 25° C.

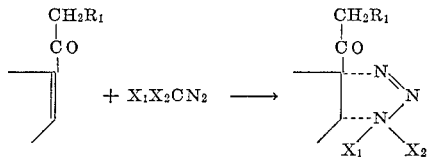

The conversion of the thus obtained 16,17-(substituted-pyrazolino)-20-keto-steroids into the corresponding 16,17-(substituted-methylene)-20-keto-steroids by splitting off of nitrogen may be performed by thermal treatment, by photolysis, or less effectively by treatment with an acid catalyst.

The thermal treatment is usually carried out at a temperature between 100° C. and 225° C. either alone at atmospheric or reduced pressure, or in an inert solvent such as Decalin or toluene until one molecular equivalent of nitrogen has been liberated, usually 15 to 60 minutes.

The photolysis is normally carried out by irradiating a solution of the 16,17-(substituted-pyrazolino)-steroid in a suitable solvent, such as dioxan, by means of a medium or high pressure mercury vapour lamp placed at a suitable distance from the reaction flask, which is preferably of quartz.

The splitting off of nitrogen may also be accomplished by treating the substituted diazomethylene compound with an acid catalyst, such as a Lewis acid like boron trifluoride, or its etherate, or an organic or inorganic acid such as perchloric acid, trifluoro acetic acid and the like. Usually the reaction is performed in such a way that the substituted diazomethylene compound is added to a solution of the acid catalyst used in a suitable organic solvent, which may be an ether, e.g. dioxane, an aliphatic ketone, such as acetone, or a halogenated hydrocarbon, such as methylene chloride. A preferred method consists of reacting the substituted diazomethylene compound with a combination of boron trifluoride or its etherate, a solvent and a surface-active catalyst which may be the diazomethylene compound iteslf. The acid catalyst treatment is preferably carried out at a temperature between 0° C. and 50° C., usually at about 20° C.; the reaction time varies between 10 minutes and some hours according to the temperature of the reaction.

The $\Delta^{16}$-20-keto-pregnene compounds to be used as starting products may be $\Delta^4$-3-keto, $\Delta^5$-3-hydroxy-, $\Delta^5$-3-acyloxy-, or 3-oxygenerated ring A saturated pregnane compounds which may be substituted in 6-, 9- and/or 11-positions in addition to the 21-position, but it is also possible to introduce these substituents after the introduction of the 16α,17α-substituted methylene group.

In the 16,17-(substituted methylene) steroids herein described, groups already present may be modified and other groups or functions may be introduced. For example, acyloxy groups may be hydrolysed to the corresponding hydroxy compound. Hydroxy groups, in particular the 3-hydroxy group may be oxidised, e.g. by Oppenauer oxidation, in the case of the 3-hydroxy-$\Delta^5$-steroids leading to 3-keto-$\Delta^4$-steroids, and additional double bonds may be introduced by known chemical or microbiological means. Thus a 3-keto-5β-steroid may be converted to a 3-keto-$\Delta^4$-steroid by means of selenium dioxide or by bromination and dehydrobromination. A 3-keto-5α-steroid or a 3-keto-$\Delta^4$-steroids may be converted into a 3-keto-$\Delta^{1,4}$-steroid by means of selenium dioxide or dichloro-dicyano quinone (D.D.Q.); a 3-keto-$\Delta^4$-steroid may be converted into a corresponding $\Delta^6$-dehydro derivative by a suitable quinone having a redox potential less than $-0.5$ such as tetrachloroquinone (chloranil).

The microbiological introduction of a double bond at position 1 may be carried out by incubation with, for example Bacillus sphaericus or Corynebacterium simplex.

In a 3-keto-5α-steroid it may also be possible to introduce double bonds at position 1 and 4 simultaneously by halogenation and subsequent dehydrohalogenation.

Halogenation in position 21 may be carried out in a manner known per se e.g. the 20-keto-pregnane derivative is treated with iodine and in a solvent such as methanol in the presence of an alkaline substance such as sodium hydroxide or calcium oxide. The 21-fluoro compounds may be obtained from the corresponding 21-iodo compounds by treatment with silver fluoride in acetonitrile.

21-acetoxy derivatives may be obtained by treatment of the 21-iodo or 21-bromo-derivative with, for example, silver acetate in pyridine. After hydrolysis the resultant 21-hydroxyl group may be resterified with an inorganic acid such as sulphuric acid or with a mono- or poly-carboxylic acid preferably having 1 to 18 carbon atoms in a known manner.

Introduction of an 11-hydroxyl group may be performed microbiologically e.g. with the aid of a micro-organism such as a Curvularia or a Rhizopus after which it may be acylated or oxidized. The 9α-bromo-11β--hydroxy compounds may be obtained from the $\Delta^{9,11}$-compounds by treatment with hypobromous acid which may be prepared in a manner per se from N-bromosuccinimide. The 9α-fluoro-11β-hydroxy compound may be prepared by treating the 9α-bromo-11β-hydroxy compound with base and reacting the resultant 9β,11β-oxide with hydrofluoric acid.

The invention is further illustrated by the following examples.

EXAMPLE I

A solution of ethyl-N-nitroso-N-allyl carbamate (80 g., 0.51 mole) in ether (300 ml.) was treated with 20% methanolic potassium hydroxide (40 ml.) dropwise with cooling. The etheral solution of diazopropene (0.25 mole) was washed with water until neutral and then added to a solution of pregnene-3β,11α-diol-20-one diacetate (11 g.) in ether (100 ml.) and methanol (300 ml.). After standing for 18 hours the solution was concentrated under reduced pressure and the 16α,17α-vinylpyrazolinopregnane-3β,11α-diol-20-one diacetate which crystallised out was collected and recrystallised from methanol (6.2 g.).

16α,17α-[3',1',-(3-vinyl - 1' - pyrazolino] - 5α - pregnane-3β,11α-diol diacetate (300 mg.) was heated in vacuo at 190°–200° C. until evolution of nitrogen has ceased (45 mins.). The resulting oil was crystallised from ethyl acetate to give 16α,17α-(1'-vinyl-methylene(-5α-pregnane-3β,11α-diol-20-one diacetate (160 mg.) M.P. 116–119° C.

A solution of 16α,17α-vinylpyrazolinopregnane - 3β, 11α-diol-20-one diacetate (5 g.) in toluene (25 ml.) was boiled under reflux in an atmosphere of nitrogen for 30 mins., and then distilled to dryness under reduced pressure. The residue was dissolved in methanol and allowed to crystallise when 16α,17α-vinylmethylenepregnane-3β, 11α-diol-20-diacetate (3.4 g.) was obtained. Hydrolysis in 5% methanolic potassium hydroxide solution gave the free 3β,11-diod.

16α,17α-vinylmethylenepregnane - 3β,11α - diol-20-one (2 g.) was dissolved in acetone (30 ml.), cooled and treated with a solution of chromic acid (1 g.) in water (1 ml.) and acetone (10 ml.). After being stirred for 2 hours the solution was diluted with water and the crude trione filtered off. Recrystallisation from aqueous methanol gave 16α,17α-vinyl-methylene-pregnane - 3,11,20-trione (1.5 g.).

16α,17α-vinylmethylenepregnane - 3,11,20 - trione (1 g.) in toluene (40 ml.) was boiled under reflux for 18 hours with D.D.Q. (1.1 g.). After cooling the quinol was filtered off and the solution run through a 3 column of alumina, distilled to dryness under reduced pressure and the residue crystallised from methanol to give pure 16α, 17α-vinylmethylenepregn - 1,4 - diene - 3,11,20 - trione (0.6 g.).

EXAMPLE II

A solution of pregna-4,16-dien-11β-ol-3,20-dione (5 g.) in ether (50 ml.) and methanol (150 ml.) was treated with a solution of diazopropene prepared according to Example I (from 40 g. ethyl-N-nitro-allyl-carbamate). After standing at room temperature for 24 hours, the solution was concentrated under reduced pressure and the residual solution allowed to crystallise. The crystals were collected and recrystallised from methanol to give 16α, 17α - [3',1' - (3' - vinyl-1'-pyrazolino)]-pregn-4-en-11β-ol-3,20-dione (3.1 g.).

The foregoing pyrazolino compound (2 g.) was dissolved in toluene (15 ml.) and boiled under reflux for 45 mins. under an atmosphere of nitrogen and then distilled to dryness under reduced pressure. 16α,17α(1' - vinylmethylene) - pregn - 4 - en-11β-ol-3,20-dione was obtained by crystallising the residue from methanol.

In a similar manner 6α-methyl-6α-chloro-, 6α--fluoro-, 6α,9α-difluoro- and 9α-fluoro - pregn - 4,16 - dien-11β-ol-3,20-dione were condensed with diazo-propene to give the corresponding 16α,17α-[3',1' - (3'-vinyl - 1' - pyrazolino)] compounds.

Pyrolysis of these pyrazolino compounds in boiling toluene as described in Example I yielded the 6α-methyl, 6α-chloro, 6α-fluoro-, 6α,9α-difluoro- and 9α-fluoro-16α,17α-(1'-vinylmethylene)-pregn - 4 - en - 11β - ol-3,20-diones, after crystallisation from methanol.

EXAMPLE III

A solution of 16α,17α-(1'-vinylmethylene)-pregn-4-en-11β-ol-3,20-dione (2.5 g.) and chloranil (2.5 g.) in t-butanol (100 ml.) was boiled under reflux for one hour and concentrated under reduced pressure. The residue was extracted with methylene chloride, filtered, washed with 2 N sodium hydroxide solution and then water until neutral. The methylene chloride solution was then run through a column of alumina (20 g.) and washed through with more methylene chloride. The solution was then evaporated to dryness and the residue crystallised from methanol to give 16α,-17α-(1'-vinylmethylene)-pregna-4,6-dien-11β-ol-3,20-dione.

In an analogous manner 6α-methyl, 6α-chloro-, 6α-fluoro-, 6α,9α-difluoro- and 9α-fluoro-16α,17α-(1'-vinylmethylene)-pregn-4-en-11β-ol-3,20-dione were converted into the Δ$^{4,6}$-pregnadiene derivatives.

EXAMPLE IV

A solution of 16α,17α-(1'-vinylmethylene)-pregn-4-en-11β-ol-3,20-dione (2.5 g.) in benzene (50 ml.) was boiled under reflux with D.D.Q. (2.5 g.) for 16 hours, cooled, filtered, washed with 2N sodium hydroxide solution and then water. After drying the benzene solution was passed down a column of alumina (100 g.) and then distilled to dryness under reduced pressure. The residue crystallised from methanol to give 16α-17α-(1'-vinylmethylene)-pregna-1,4-diene-11β-ol-3,20-dione.

In a similar manner 6α-methyl, 6α-chloro-, 6α-fluoro, 6α,9α-difluoro and 9α-fluoro-16α,17α-(1'-vinylmethylene)-pregn-4-en-11β-ol-3,20-dione were converted into the corresponding Δ$^{1,4}$-pregna-diene derivatives.

EXAMPLE V

A solution of 16α,17α-(1'-vinylmethylene)-pregn-4,6-dien-11β-ol-3,20-dione (1 g.) and D.D.Q. (1 g.) in benzene (20 ml.) was boiled under reflux for 16 hours, cooled and filtered. The filtrate was washed with N sodium hydroxide solution and then water, dried and distilled to dryness under reduced pressure. The residue after crystallisation from methanol yielded 16α,17α-(1'-vinylmethylene)-pregna-1,4,6-triene-11β-ol-3,20-dione.

In a similar manner 6α-methyl-, 6α-chloro-, 6α-fluoro-, 6α,9α-difluoro and 9α-fluoro-16α,17α-(1'-vinylmethylene)-pregna-4,6-dien-11β-ol-3,20-dione have been converted into the corresponding Δ$^{1,4,6}$-pregnatriene derivatives.

EXAMPLE VI

A solution of ethyl-N-nitroso-propargylcarbamate (10 g.) in ether (10 ml.) was treated with 20% methanolic potassium hydroxide (5 ml.) dropwise with ice cooling. The ethereal solution of diazo propene thus formed was washed with water until neutral and then added to a solution of pregn-4,16-dien-11β-ol-3,20-dione (2.5 g.) in ether (30 ml.) and methanol (80 ml.). After standing at 5–10° C. for 2 days, the solution was concentrated to 20 ml. under reduced pressure and the solution set aside at 0–2° C. for 2 days to allow the product to crystallise. The product was filtered off and recrystallised from methanol to give 16α,-[3'-1'-(3-ethylnyl-1'-pyrazolino)]pregn-4-en-11β-ol-3,20-dione.

In a similar manner the 6α-methyl-, 6α-chloro-, 6α-fluoro-, 6α,9α-difluoro- and 9α-fluoro derivatives of 16α,-17α-[3',1'-(3'- ethynyl-1'-pyrazolino)]-pregn - 4 - en-11β-ol-3,20-dione were prepared.

EXAMPLE VII (a) A 2% solution of 16α,17α-[3',1'-ethynyl-1'-pyrazolino)]-pregn-4-en-11β-ol-3,20-dione (1 g.) in dioxan was irradiated in a quartz flask by means of a medium pressure mercury vapour lamp set 6 cm. way for 45 mins. The solution was then evaporated to dryness under reduced pressure and the residue crystallised from methanol to give 16α,17α-(1'-ethynyl methylene)-pregn-4-en-11β-ol-3,20-dione.

(b) A solution of 16α,17α-[3',1'-(3-ethynyl-1'-pyrazolino)]-pregn-4-en-11β-ol-3,20-dione (2 g.) in toluene (15 ml.) was boiled under reflux for 45 mins. and then distilled to dryness under reduced pressure. Crystallisation of the residue from methanol yielded 16α,17α-(1'-ethynyl methylene)-pregn-4-en-11β-ol-3,20-dione.

In an analogous way the 6α-methyl-, 6α-chloro-, 6α-fluoro-,6α,9α-difluoro- and 9α-fluoro-derivatives of 16α,-17α-[3',1',-(3'-ethynyl-1'-pyrazolino)]-pregn-4-en-11β-ol-3,20-dione have been converted into the corresponding 16α,17α-(1'-ethynyl methylene) - pregn-4-en-11β-ol-3,20-dione analogues.

EXAMPLE VIII

Pregna-4,16-dien-11β-ol-3,20-dione (5 g.) in ether (50 ml.) and methanol (150 ml.) was treated with a solution of diazo-ethane prepared from nitrosoethylurea (20 g.). The solution was left at room temperature in the dark for two days and the solvent then removed by distillation under reduced pressure. The residue was crystallised from methanol to give 16α,17α - [3',1' - (3'-methyl-1'-pyrazolino)]-pregn-4-en-11β-ol-3,20-dione (3.3 g.).

A solution of 16α,17α - [3',1' - (3'-methyl-1'-pyrazolino)]-pregn-4-en-11β-ol-3,20-dione (2.0 g.) in acetone (50 ml.) was treated with boron trifluoride (2 ml.) and a few carborundum chips. After two hours at room temperature the solution was warmed to complete liberation of nitrogen. The solution was poured into dilute sodium bicarbonate solution and the precipitate collected. After crystallisation from acetone-methanol there was obtained 16α,17α-(1'-methylmethylene)-pregn-4-en - 11β-ol.-3,20-dione.

In an analogous manner pregna-4,16-dien-11β-ol-3,20-dione has been condensed with 1-diazopropane, 2-diazopropane, diazo-n- butane, diazocyclopropane and phenyldiazomethane to give the corresponding 16α,17α-pyrazolino compounds substituted in the methylene group by 3'-ethyl-, 3',3'-dimethyl- 3'-n-propyl-, 3',3'-spirocyclopropyl-, and 3'-phenyl respectively.

Treatment of these substituted pyrazolino compounds with boron trifluoride etherate as described above yielded 16α,17α-(1'-ethylmethylene)-, 16α,17α - (1',1' - dimethyl methylene-, 16α,17α-(1'-n-propyl methylene)-, 16α,17α-(1',1' - spirocyclomethylene) - and 16α,17α - (1'-phenvl methylene)-pregn-4-en-11β-ol-3,20-dione respectively.

EXAMPLE IX

In the manner described under Example VIII 9α-fluoropregna-4,16-dien-11β-ol-3,20-dione was condensed with diazo-ethane, 1-diazopropane, 2-diazopropane, diazo-n-butane, diazocyclopropane and phenyldiazomethane to give the 16α,17α-(3',1'-pyrazolino)-compounds substituted in the methylene group by 3'-methyl-, 3'-ethyl-, 3',3'-dimethyl-, 3'-n-propyl-, 3',3' - spirocyclopropyl and 3'-phenyl respectively.

Treatment of these 16α,17α-(3',1' - pyrazolino)-compounds in the manner described yielded the 16α,17α-(1'-methyl methylene)-, 16α,17α-(1'-ethyl-methylene)-, 16α, 17α - (1',1' - dimethyl methylene)-, 16α,17α-(1'-n-propyl-methylene)-, 16α,17α - (1' - spirocyclopropyl methylene)- and 16α,17α-(1'-phenyl methylene)-pregn-4-en-11β-ol-3,20-dione respectively.

In a similar manner 6α-methyl-, 6α-chloro-, 6α-fluoro- and 6α,9α - difluoro-pregn - 4,16 - dien-11β-ol-3,20-dione have been condensed with diazo-ethane, 1-diazopropane, 2-diazopropane, diazo-n-butane, diazocyclopropane and phenyldiazomethane to give the corresponding substituted pyrazolino compounds.

Splitting off of nitrogen with boron trifluoride etherate in the manner described gave the 16α,17α-methylene-pregn-4-en-11β-ol-3,20-dione derivative substituted in the 16α,17α-methylene group by either methyl, ethyl, dimethyl, n-propyl, spirocyclopropyl or phenyl and in the nucleur by 6α-methyl-, 6α-chloro-, 6α-fluoro or 6α,9α-difluoro.

EXAMPLE X

Pregna-4,9(11),16 - trien - 21-ol-3,20-dione acetate (15 g.) in methanol (100 ml.) and methylene chloride (100 ml.) was distilled under reduced pressure to remove the greater part of the methylene chloride and a solution of diazopropene (prepared from 40 g. of nitrosoallylurea) in ether (600 ml.) and methanol (100 ml.) added. After 4 days at 3° C. the methylene chloride and ether were distilled off under reduced pressure and the crude pyrazolino compound filtered off and crystallised from methanol to give pure 16α,17α-(3'-vinyl-1'-pyrazolino)-pregna-4,9(11)-dien-21-ol-3,20-dione acetate. Pyrolysis of this pyrazolino compound as described under Example I yielded 16α,17α-(1'-vinylmethylene)-pregna-4,9(11)-dien-21-ol-3,20-dione acetate.

In a similar manner 6α-fluoro-pregn-4,9(11),16-trien-21-ol-3,20-dione acetate was converted via the pyrazolino compound into 6α-fluoro-16α,17α-(1'-vinylmethylene)-pregna-4,9(11)-dien-21-ol-3,20-dione acetate.

EXAMPLE XI

Pregna-4,16-dien-21-ol-3,11,20-trione acetate and pregna-4,16-diene-11β,21-diol-3,20-dione 21-acetate were converted into the corresponding 3'-vinyl-1'-pyrazolino compounds as described under Example 1. The resultant pyrazolino compounds were irradiated in a quartz flask in dioxan (2% solution) by means of a medium pressure mercury vapour lamp placed 6 cm. away for 45 mins. After removal of the dioxan by distillation under reduced pressure the residues were crystallised from methanol to yield 16α,17α-(1'-vinylmethylene)-pregn-4-en-21-ol-3,11,20-trione acetate and 16α,17α-(1'-vinylmethylene)-pregn-4-en-11β,21-diol-3,20-dione 21 acetate.

EXAMPLE XII

6α-methyl-, 6α-chloro-, 6α-fluoro, 6α,9α-difluoro- and 9α-fluoro-pregn-4,16-dien-11β,21-diol-3,20-dione 21-acetate were converted into the corresponding 3'-vinyl-1'-pyrazolino compounds as described under Example I. Pyrolysis of these pyrazolino compounds at 185–195° C. gave products which after crystallisation from methanol yielded 6α-methyl-, 6α-chloro-, 6α-fluoro-, 6α,9α-difluoro- and 9α-fluoro-16α,17α-(1'-vinylmethylene)-pregn-4-en-11β,21-diol-3,20-dione 21-acetate respectively.

EXAMPLE XIII

A solution of 16α,17α-(1'-vinylmethylene)-pregn-4-en-11β,21-diol-3,20-dione 21-acetate (2.5 g.) and chloranil (2.5 g.) in t-butyl alcohol (100 ml.) was refluxed for one hour and then concentrated under reduced pressure. The residue was dissolved in methylene chloride, filtered and then washed with 2 N sodium hydroxide solution and then with water until neutral. The solution was then passed down a column of alumino (20 g.), the eluate evaporated and the residue crystallised to give 16α,17α-(1'-vinylmethylene)-pregna-4,6-dien-11β,21-diol-3,20-dione 21-acetate.

In an analogous manner 6α-methyl-, 6α-chloro-, 6α-fluoro-, 6α,9α-difluoro- and 9α-fluoro-16α,17α-(1'-vinylmethylene)-pregn-4-en-11β,21-diol-3,20-dione 21-acetate were converted into the corresponding $\Delta^{4,6}$-pregna-diene derivatives.

EXAMPLE XIV

A solution of 16α,17α-(1'-vinylmethylene)-pregn-4-en-11β,21-diol-3,20-dione 21-acetate (2.5 g.) and D.D.Q. (2.5 g.) in dioxan (50 ml.) was refluxed for 16 hours, cooled and filtered. The filtrate was concentrated under reduced pressure and then diluted with methylene chloride. The solution was then washed with dilute sodium carbonate solution and water, dried over sodium sulphate and evaporated to dryness. The residue was passed down alumina (50 g.) in benzene-petrol (60/80) 2:1 solution. The product recovered by removal of the benzene-petrol was recrystallised from acetone/methanol to give 16α,17α-(1'-vinylmethylene)-pregna-1,4-dien-11β,21-diol-3,20-dione 21-acetate (1.5 g.).

In a similar manner 6α-methyl-, 6α-chloro-, 6α-fluoro-, 6α,9α-difluoro- and 9α-fluoro-16α,17α-(1'-vinylmethylene)-pregn-4-en-11β,21-diol-3,20-dione 21-acetate were converted into the corresponding $\Delta^{1,4}$-pregnadiene derivatives.

EXAMPLE XV

A solution of 16α,17α-(1'-vinylmethylene)-pregna-4,6-dien-11β,21-diol-3,20-dione 21-acetate (1 g.) and D.D.Q. (1 g.) in benzene (20 ml.) was boiled under reflux for ten hours, cooled and filtered. The filtrate was evaporated under reduced pressure and the residue dissolved in benzene, washed with 2 N sodium hydroxide solution and then with water until neutral, dried over sodium sulphate and passed down a column of alumina (50 g.). The benzene eluate was distilled to dryness under reduced pressure and the residue crystallised from methanol to give 16α,17α-(1'-vinylmethylene)-pregna-1,4,6-trien-11β,21-diol-3,20-dione 21-acetate.

In an analogous manner 6α-methyl-, 6α-chloro-, 6α-fluoro-, and 9α-fluoro-16α,17α-(1'-vinylmethylene)-pregna-1,4-dien-11β,21-diol-3,20-dione 21-acetate were converted to the corresponding $\Delta^{1,4,6}$-pregnatriene derivatives.

EXAMPLE XVI

Hydrolysis of the 16α,17α-(1'-vinylmethylene)-20-keto-21-acetoxy-pregnane derivatives described in Examples II to IX to the corresponding free 21-hydroxy derivatives was carried out by dissolving the steroid in a saturated solution of potassium bicarbonate in methanol (40 vols.) under nitrogen and stirring at room temperature for one hour. The solution was neutralised with acetic acid, concentrated under reduced pressure and the product precipitated by addition of water.

Re-esterification was carried out by dissolving the 21-hydroxy steroid in two parts of pyridine and adding (1) the appropriate anhydride (2 moles) or (2) the appropriate acid chloride (1.5 moles), allowing to stand at room temperature for 18 hours and decomposing by the slow addition of water with stirring. The esters were extracted with methylene chloride, washed with dilute alkali and then water, evaporated to dryness and recrystallised.

The following 21-esters were prepared: Propionate, pivalate β-phenylpropionate, decanoate, hydrogen succinate.

EXAMPLE XVII

Pregna-4,16-diene-11β,21-diol-3,20-dione 21-acetate (15 g.) in methylene chloride (100 ml.) and methanol (100 ml.) was treated with a solution of diazopropyne (prepared from 40 g. of nitrosopropargylurea) and allowed to stand 4 days at 0°–5° C. The solution was then concentrated to about 40 ml. under reduced pressure and the product allowed to crystallise. The crude product was recrystallised from methanol to give pure 16α,17α-(3'-ethynyl-1'-pyrazolino)-pregn-4-ene-11β,21-diol-3,20-one 21-acetate.

Pyrolysis of this pyrazolino compound at 180°–190° C. in vacuo for 25 mins. followed by chromatographic purification in benzene-hexane 2:1 yielded 16α,17α-(1'-ethynylmethylene)-pregn-4-en-11β,21-diol-3,20-dione 21-acetate.

In a similar manner 6α-methyl-, 6α-chloro-, 6α-fluoro- and 9α-fluoro-pregna-4,16-diene-11β,21-diol-3,20-dione 21-acetate were condensed with diazopropyne to give the corresponding 3',1'-(3'-ethynyl-methylene-1'-pyrazolino)-compounds. These pyrazolino compounds on pyrolysis yielded the corresponding 6α-methyl-, 6α-chloro-, 6α-fluoro- and 9α-fluoro-16α,17α-(1'-ethynyl-methylene)-pregn-4-en-11β,21-dione 21-acetate respectively.

EXAMPLE XVIII

Pregna-4,16-diene-11β,21-diol-3,20-dione 21-acetate (5 g.) in methylene chloride (50 ml.) and methanol (50 ml.) was treated with an etheral solution of diazoethane prepared from nitrosoethylurea (40 g.). The solution was kept at 0°–5° C. for 4 days and then concentrated under reduced pressure to about 20 ml. and set aside at 0°–5° C. to crystallise. The solid was filtered off and recrystallised from methanol to give pure 16α,17α-3',1'-(3'-methyl-1'-pyrazolino)-pregn-4-en-11β,21-diol-3,20-dione 21-acetate (4.8 g.).

The pyrazolino compound (2 g.) was photolysed in dioxan (200 ml.) for 45 mins., evaporated under reduced pressure and the residue crystallised from methanol to give 16α,17α - (1'-methylmethylene)-pregn-4-en-11β,21-diol-3,20-dione 21-acetate (1.2 g.).

In an analogous manner pregna-4,16-diene-11β,21-diol-3,20-dione 21-acetate was condensed with 1-diazopropane, 2-diazopropane, diazo-n-butane, diazo-cyclopropane and phenyl-diazo methane to give the corresponding pyrazolino compounds substituted in the methylene group with ethyl, dimethyl, n-propyl, spiro-cyclo-propyl and phenyl respectively. Photolysis of these pyrazolino compounds in the manner described above yielded 16α,17α-(1'-ethylmethylene)-, 16α,17α - (1',1'-dimethylmethylene)-, 16α, 17α - (1'-n-propylmethylene)-, 16α,17α-(1',1'-spirocyclopropylmethylene)- and 16α,17α - (1'-phenylmethylene)-pregn-4-en-11β,21-diol-3,20-dione 21-acetate respectively.

EXAMPLE XIX

In a manner described under Example VIII 9α-fluoropregn - 4,16-diene-11β,21-diol-3,20-dione 21-acetate was condensed with diazo-ethane, 1-diazo-propane, 2-diazopropane-diazo-n-butane, diazo-cyclo-propane and phenyl-diazomethane to give the pyrazolino compounds substituted in the methylene group by 3'-methyl-, 3'-ethyl, 3',3'-dimethyl, 3'-n-propyl, 3',3'-spirocyclopropyl and 3'-phenyl respectively.

Photolysis of these substituted pyrazolino compounds as described in Example VIII yielded the 16α,17α-(1'-methylmethylene)-, 16α,17α - (1'-ethylmethylene), 16α, 17α - (1',1' - dimethyl-methylene)-, 16α,17α-(1'-propylmethylene)-, 16α,17α-(1',1'-spirocyclopropylmethylene)- and 16α,17α-(1'-phenylmethylene)-9α-fluoro-pregn-4-ene-11β,21-diol-3,20-dione 21-acetate respectively.

In a similar manner 6α-methyl, 6α-fluoro-pregna-4,16-diene-11β,21-diol-3,20-dione 21-acetate have been condensed with diazo-ethane, 1-diazo-propane, 2-diazo-propane, diazo-n-butane, diazo-cyclopropane and phenyldiazomethane to give the substituted pyrazolino compounds.

Photolysis in the manner described gave 16α,17α-methylene - pregn-4-ene-11β,21-diol-3,20-dione 21-acetate substituted in the 16α,17α-methylene group by either methyl, ethyl, n-propyl, dimethyl, spirocyclo-propyl or phenyl as in position 6α by either methyl, chloro or fluoro.

EXAMPLE XX

In a manner described under Example VIII pregna-4,9(11),16-trien-21-ol-3,20-dione acetate was condensed with diazo-ethane, 1-diazo-propane, 2-diazopropane, diazobutane, diazocyclopropane and phenyl-diazomethane to give the pyrazolino compounds substituted in the methylene group by 3'-methyl-, 3'-ethyl-, 3',3'-dimethyl, 3'-n-propyl, 3',3'-spirocyclopropyl and 3'-phenyl respectively.

Photolysis of a 1% solution in dioxan of the above pyrazolino compound yielded the corresponding 16α,17α-(1' - methylmethylene)-, 16α,17α - (1'-ethylmethylene)-, 16α,17α - (1',1'-dimethylmethylene)-, 16α,17α-(1'-n-propylmethylene)-, 16α,17α-(1',1'-spirocyclo-propyl-methylene) and 16α,17α-(1'-phenylmethylene)-pregna-4,9(11)-diene-21-ol-3,20-dione acetate, respectively.

EXAMPLE XXI

16α,17α - 3',1' - (3' - methyl - 1' - pyrazolino) - pregna-4,9(11)-dien-21-ol-3,20-dione acetate (1.8 g.) was dissolved in peroxide free dioxan (100 ml.) and water (20 ml.) and treated with N-bromoacetamide (0.84 g.; 1.3 moles) and a few drops of perchloric acid (10%). The solution was stirred for 15 mins. and then a saturated solution of sodium bisulphite added to destroy excess bromoacetamide. After addition of chloride, the extract was washed with dilute sodium bicarbonate solution and then water, dried and evaporated under reduced pressure to give 16α,17α-(3'-methyl-1'-pyrazolino) - 9α - bromo-pregn-4-ene-11β,21-diol-3,20-dione 21-acetate (2.1 g.). This product was dissolved in methanol (200 ml.) and potassium acetate (5.5 g.) added and the solution boiled under reflux for 3 hours, then concentrated under reduced pressure and the product precipitated by the addition of water. Recrystallisation from acetone/hexane gave pure 9β,11β-oxido-16α,17α-3',1'-(3'-methyl - 1' - pyrazolino)-pregn-4-en-21-ol-3,20-dione acetate (1.1 g.).

The foregoing 9β,11β-oxido-16α,17α-pyrazolino compound (1.0 g.) in dioxan (50 ml.) was irradiated in a quartz flask by means of a medium pressure mercury vapour lamp situated 6 cm. away for 45 mins. The dioxan was then distilled off under reduced pressure and the residue crystallised from methanol to yield 9β,11β-oxido-16α,17α-(1'-methylmethylene)-pregn - 4 - en - 21 - ol-3,20-dione acetate (0.6 g.).

The foregoing compound (0.6 g.) was dissolved in methylene chloride (4 ml.) and added to a solution of anhydrous hydrofluoric acid (1.2 ml.) in tetrahydrofuran (2.3 ml.) and methylene chloride (0.8 ml.) at —60° C. The solution was then allowed to warm up to —5° C. and maintained there for 3½ hours, and then washed in an excess of saturated sodium bicarbonate solution with more methylene chloride. The methylene chloride layer was separated, washed with water, dried and evaporated under reduced pressure. The residue was dissolved in benzene/hexane and chromatographed on silica gel, removal of the solvent and recrystallisation from aqueous methanol gave 9α-fluoro-16α,17α-(1'-methylmethylene)-pregna-4-ene-11β,21-diol-3,20-dione 21-acetate (0.4 g.). In a similar manner 16α,17α-(1-ethylmethylene)-, 16α,17α-(1'-n-propylmethylene)-, 16α,17α-(1',1'-dimethyl methylene)-, 16α,17α-(1',1'-spirocyclomethylene)- and 16α,17α-(1'-phenylmethylene)-9α-fluoro - pregna - 4 - ene-11β,21-diol-3,20-dione 21-acetate were prepared.

EXAMPLE XXII

A solution of 16α,17α-(1'-methylmethylene)-21-hydroxy-$\Delta^{1,4,9(11)}$-pregnatrien-3,20-dione acetate (3.53 g.) in dimethylformamide (21.2 cc.) was reacted with 70% perchloric acid (0.6 cc.) and N-bromo-succinimide in the absence of light as described in a previous example. The reaction furnished 9α-bromo-11β,21-dihydroxy-16α,17α-(1' - methylmethylene) - $\Delta^{1,4}$ - pregnadiene-3,20-dione 11-formate 21-acetate (4.24 g.); M.P. 160–166° C.; $[\alpha]_D$ +159° (C, 0.5 in chloroform).

9α-bromo - 11β,21 - dihydroxy - 16α,17α - (1' - methylmethylene) - $\Delta^{1,4}$ - pregnadiene-3,20-dione 11-formate 21-acetate (4.24 g.) in tetrahydrofuran (35 cc.) and methanol (44 cc.) was treated with a solution of sodium (0.268 g.) in methanol (10.6 cc.) at 15° C., as described in a previous example, to give 9β,11β-oxido-16α,17α-(1'-methylmethylene) - 21 - hydroxy - $\Delta^{1,4}$ - pregnadiene-3,20-dione (2.37 g.); M.P. 166–168° C.; $[\alpha]_D$ +105° (C, 0.95 in chloroform).

A solution of 9β,11β-oxido-16α,17α-(1'-methylmethylene)-21-hydroxy-$\Delta^{1,4}$-pregnadiene-3,20-dione (1.54 g.) in pure chloroform (8.6 cc.) was added to anhydrous fluoride (4.16 g.) in pure chloroform (2.88 cc.) and tetrahydrofuran (6.4 cc.) at —60° C. and washed in with chloroform (8 cc.). After one hour at 0° C. and 0.5 hours at 15° C., the product was isolated exactly as described in a previous example to give 9α-fluoro-11β,21-dihydroxy-16α,17α - (1' - methylmethylene) - $\Delta^{1,4}$ - pregnadiene-3,20-dione (1.5 g.); M.P. 224–230° C.; $[\alpha]_D$ +154° (C, 0.95 in chloroform); $\lambda_{max}$ (in ethanol) 240 mμ ($\epsilon$ 17,400).

EXAMPLE XXIII

Treatment of 9α-fluoro-11β,21-dihydroxy-16α,17α-(1'-vinylmethylene)-$\Delta^4$-pregnen-3,20-dione 21-acetate (2 g.) in boiling benzene (20 cc.) and acetic acid (2 cc.) with dichlorodicyanobenzoquinone (1.81 g.) for 15 hours and hydrolysis of the product with 1.1 mole equivalents of sodium hydroxide in aqueous methanol furnished 9α-fluoro-11β,21-dihydroxy - 16α,17α - (1' - vinylmethylene)-$\Delta^{1,4}$-pregnadiene-3,20-dione (1.4 g.), $\lambda_{max}$ (in ethanol) 240 mμ ($\epsilon$ 17,100).

We claim:
1. 16,17-substituted steroids having the formula:

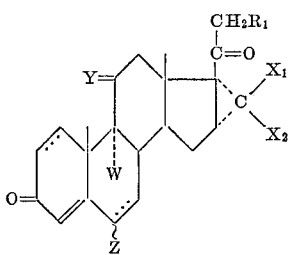

wherein $C_1$–$C_2$ and $C_6$–$C_7$ are selected from the group consisting of a saturated and an unsaturated bond, Y is selected from the group consisting of H(OH) and keto, W is selected from the group consisting of hydrogen and halogen, Z is selected from the group consisting of hydrogen, methyl and halogen, $R_1$ is selected from the group consisting of hydrogen, hydroxyl, acyloxy and halogen, wherein acyloxy is derived from an acid selected from the group consisting of an inorganic acid and an organic carboxylic acid having 1–18 carbon atoms, $X_1$ is selected from the group consisting of hydrogen, lower alkyl, alkenyl, alkynyl, and phenyl, $X_2$ is selected from the group consisting of lower alkyl, alkenyl and alkynyl, $X_1+X_2$ form together with the methylene carbon atom a lower cycloaliphatic group.

2. 16,17-substituted steroids having the formula:

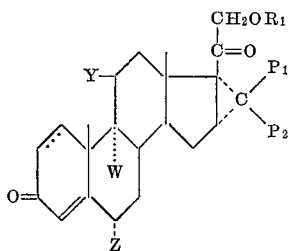

wherein $C_1$–$C_2$ is selected from the group consisting of a saturated and an unsaturated bond, Y is selected from the group consisting of H($\beta$OH) and keto, W is selected from the group consisting of hydrogen and fluoro, Z is selected from the group consisting of hydrogen, methyl, chloro, and fluoro, $R_1$ is selected from the group consisting of hydrogen and acyl derived from an organic carboxylic acid having 1–18 carbon atoms, $P_1$ is hydrogen, and $P_2$ is selected from the group consisting of lower alkyl having 1 to 6 carbon atoms, alkenyl and alkynyl.

References Cited

UNITED STATES PATENTS 3,418,316   12/1968   Taub et al. _____ 260—239.5

ELBERT L. ROBERTS, Primary Examiner

U.S. Cl. X.R.

260—239.5, 239.55